United States Patent [19]
Fletcher et al.

[11] Patent Number: 5,272,929
[45] Date of Patent: Dec. 28, 1993

[54] TRANSMISSION SHAFT CARRYING AT LEAST TWO GEARS

[75] Inventors: Melvern W. Fletcher, Worsley; Trevor Pitchford, Bolton; David G. Cooper, Urmston, all of England

[73] Assignee: Eaton Corporation, Cleveland, Ohio

[21] Appl. No.: 733,799

[22] Filed: Jul. 22, 1991

[30] Foreign Application Priority Data

Jul. 31, 1990 [GB] United Kingdom ............... 9016768

[51] Int. Cl.⁵ ........................... F16H 3/02; F16H 3/08
[52] U.S. Cl. ........................................ 74/331; 74/745
[58] Field of Search ................ 29/893, 893.3; 74/331, 74/332, 412, 457, 432, 460, 745

[56] References Cited

U.S. PATENT DOCUMENTS

| | | | |
|---|---|---|---|
| 2,704,882 | 3/1955 | Olson | 29/893 |
| 4,154,126 | 5/1979 | Kelbel | 74/332 X |
| 4,388,838 | 6/1983 | Richards et al. | 74/331 |
| 4,432,251 | 2/1984 | Malott | 74/337.5 |
| 4,719,819 | 1/1988 | Tsutsumikoshi et al. | 74/745 |
| 4,735,109 | 4/1988 | Richards et al. | 74/745 |

FOREIGN PATENT DOCUMENTS

| | | |
|---|---|---|
| 43443 | 1/1982 | European Pat. Off. |
| 1180598 | 10/1964 | Fed. Rep. of Germany |
| 2937143 | 5/1980 | Fed. Rep. of Germany |

Primary Examiner—Leslie A. Braun
Assistant Examiner—Khoi Ta
Attorney, Agent, or Firm—H. D. Gordon

[57] ABSTRACT

A gear shaft assembly (42) is provided including a shaft (5) having a first set of gear teeth (6) formed integrally in a second portion (51) thereof and extensions of said teeth extend axially over an adjacent reduced diameter second portion (50) for receivably mounting a second gear (7) for rotation with the shaft.

7 Claims, 4 Drawing Sheets

4) THE EXTENDED TOOTH FROM WHICH WILL BE USED AS A SPLINE WILL BE IN-LINE WITH THE TOOTH THEREFORE NO EXTRA TOLERANCE IS REQUIRED TO LINE UP THE SPLINE TO THE TEETH AS WITH FIG. 6A.

4) NO SEPARATE 'KEY'

TRANSMISSION SHAFT CARRYING AT LEAST TWO GEARS

BACKGROUND OF THE INVENTION

1. Related Applications

This application claims priority from British Application No. GB 9016768.5 filed 31 July 1990 and assigned to the same assignee, Eaton Corporation, as this application.

2. Field of the Invention

The present invention relates to a gear shaft for a transmission, on which shaft at least two gears are to be carried. In particular, the present invention relates to a gear shaft carrying at least a first and a second gear wherein the first gear is formed on the shaft from the material of the shaft, often because the diameter of the gear is small enough not to allow radially intermediate splines or other mounting devices, and subsequent gears are desired to be removable, and have a larger diameter which allows the intermediary of splines.

3. Description of the Prior Art

Gear shafts for transmissions carrying two or more gears fixed for rotation therewith are well known in the prior art as may be seen by reference to the countershafts illustrated in U.S. Pat. Nos. 3,105,395 and 4,754,665, the disclosures of which are hereby incorporated by reference.

Transmission gear shafts carrying one or more first gears formed integrally therewith (often in the form of involute spline/gear teeth) and one or more non-integral second gears permanently or detachably fixed to the shaft for rotation therewith are also known in the prior art as may be seen by reference to U.S. Pat. Nos. 4,432,251; 4,735,109; 4,375,172 and RE 32,591, the disclosures of which are incorporated herein by reference.

These prior art structures were not totally satisfactory as, if the first gear, or gears, and the splines for the second gear, or gears, are individually formed on a shaft, they require different machines, e.g. transfer from one machine to another, realignments and other such time-consuming steps and complications. Moreover, each tool requires an axial run-out length, so that an axial length of the shaft between the gears cannot be used and space and material are wasted. If the spline or splines are replaced by one or more longitudinal keyway(s) with a body inserted therein to form a projection, similar problems of transfers, realignments and loss of some axial length, are encountered.

Also, if the second gear or gears are welded on the shaft, while there is not so much machine tool run-out, these latter gears may still be circumferentially misaligned with the first gear, and furthermore none of these second gears is removable.

SUMMARY OF THE INVENTION

In accordance with the present invention, the drawbacks of the prior art are overcome or minimized by providing a transmission gear shaft assembly, including at least one first gear formed integrally therewith, which avoids the prior art problems and yet is able to mount one or more second gears detachably on a shaft carrying a first gear machined from it, without wasting axial space between the first gear and the nearest or sole second gear.

The present invention proposes that the external splines or keyway for the second gear or gears be formed from the first gear teeth themselves, either by initially reducing the diameter of the shaft at the axial position where the splines are to be formed from the teeth, or by reducing or removing the addenda of the teeth of the first gear after they have been formed (thereby to form a series of splines automatically aligned with the respective teeth); or by machining one or more of the gaps of the teeth, to form one or more keyways automatically aligned with the gaps of the teeth, and removing all other teeth sufficiently. The splines will preferably not be machined laterally afterwards in their production, since this might introduce a misalignment. Preferably, all the first gear teeth are conveniently used to form the set of splines, since any unused teeth would have to be machined down completely. In general, the gear teeth contours will follow involutes, and so the spline flanks will automatically also be involute, as is not at all uncommon with splines.

The use of splines produced from gear teeth formed integral with a gear shaft is not in itself unknown, (see U.S. Pat. No. 4,388,838, the disclosure of which is incorporated by reference) and the advantages thereof in circumferential alignment and material or space conservation are recognized.

However, the present inventive teaching of forming splines or keyways for a shaft indirectly by forming teeth of a first gear to have greater axial length than that required, and then forming splines or keyways for a subsequent gear to be slid on from the axial extensions of the gear teeth, whether by removing or reducing the addenda from the already formed teeth, or by forming the splined portion from an already reduced diameter portion of the shaft, in the same operation as the gear teeth are formed, and as continuous extensions of those teeth, is not taught in the prior art.

Not only is axial space saved by avoiding individual machining tool "run out" lengths, but also a perpendicular abutment shoulder is formed for the removable, second gear wheel to be slid on the splines or keyway, by the proximal addenda portions of the gear teeth of the first gear.

Accordingly, it is an object of the present invention to provide an improved shaft structure for a gear shaft having a first gear formed integrally therewith and a second gear removably mounted thereto for rotation therewith.

This and other objects and advantages of the present invention will become more apparent from the following description of embodiments thereof, given by way of example, in conjunction with the drawings.

DESCRIPTION OF THE PREFERRED EMBODIMENT

The terms "first" and "second", as used herein, do not refer to ratios, as a driver would understand the terms. Where only one "second" gear is mentioned herein, it should be assumed that more "second" gears may be present and that any such further "second" gears will, as further objectives, be aligned with the first gear to the same accuracy as the adjacent "second" gear will be.

Figure 1:
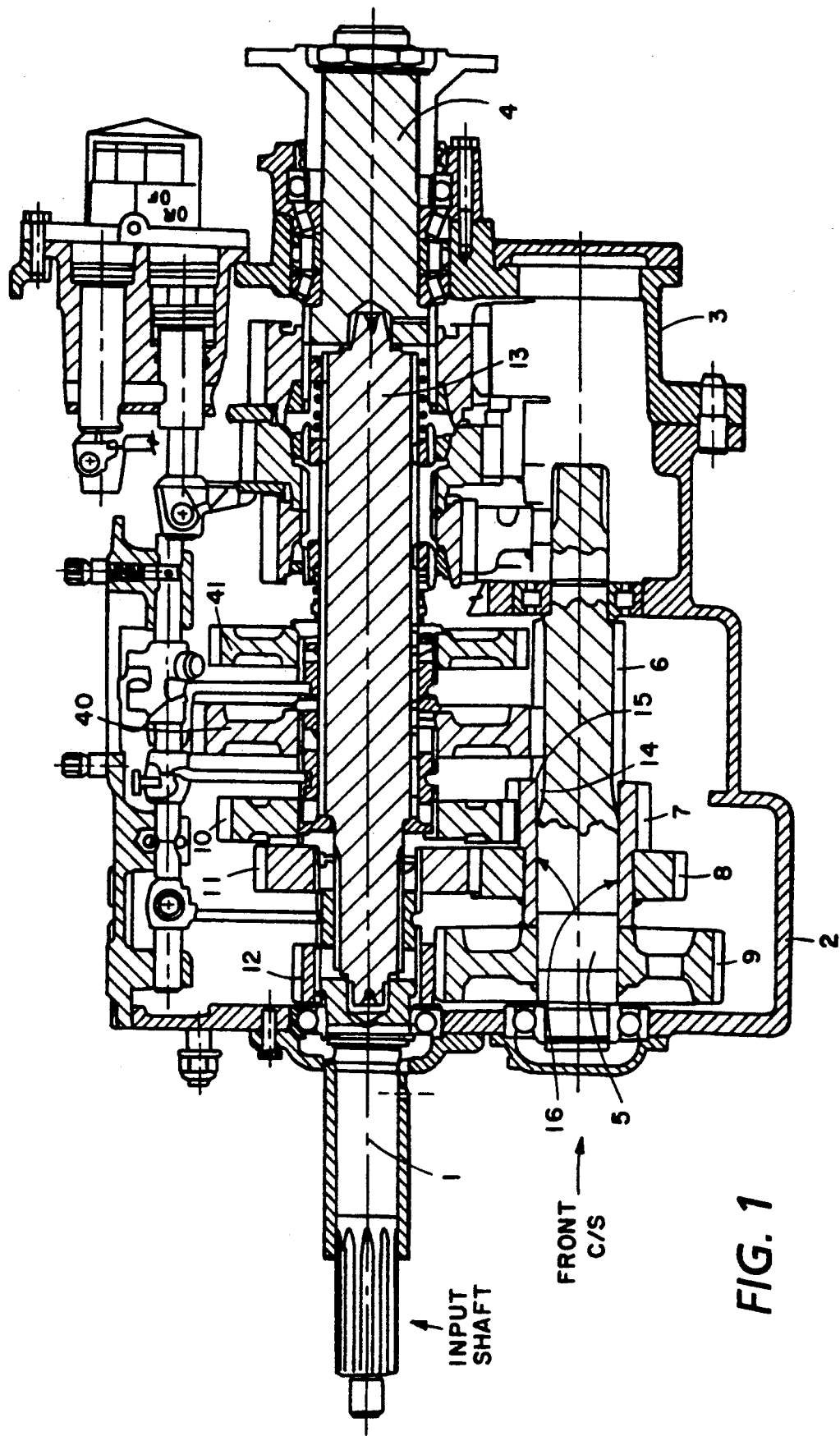
FIG. 1 shows a sectional view of a known twin countershaft transmission (only one countershaft being visible) illustrating separately machined teeth of a first countershaft gear and welded-on second gears.

Referring to FIG. 1, a twin countershaft compound transmission has an input shaft 1, a main section 2, an auxiliary section 3 and an output shaft 4. We are concerned only with a front countershaft 5 which has gear teeth 6 formed on it by machining, hobbing, etc. which involves cutting the grooves between the roots of the teeth, and shaping the teeth to involutes or other standard rolling curves. Transmissions of this general type may be seen by reference to above-mentioned U.S. Pat. Nos. 4,432,251; 4,735,109; 4,375,172; 3,105,395 and RE 32,591.

The non-hatched part of countershaft 5 to the left has had pushed on it, and then welded to it, countershaft gears 7, 8 and 9, which countershaft gears mesh with mainshaft gears 10, 11 and 12 on a mainshaft 13. Gear 6 is the "first" gear as identified for the purposes of this invention, and has teeth formed by longitudinal cuts into shaft 5 on what is seen in the cross-hatched section thereof. The cuts between the teeth reduce at portion 14 due to the progressive removal of bite of the cutting (hobbing) tool, herein referred to as "run out". Gear 7b is the adjacent "second" gear as identified herein and may extend over "run out" length 14 as shown. However, there can be no mating splines under this run out length 14, which is therefore unsupported rotationally.

It is noted that the "first" gear 6 will constantly mesh with a first speed ratio mainshaft gear 40 and, also through idlers (not shown), with a reverse mainshaft gear 41.

The adjacent second gear 7 is not removable, and it would be desirable to be able to slidingly install its end 15 of gear 7 against a truly transverse abutment or stop for extending gear 6 over the run out length 14. A stop for end 15 is provided by cutting the tops off teeth of first gear 7 down to the outside diameter of the non-hatched portion 16 of shaft 5, equal to the inside diameter shown of pushed on and welded gear 7. Provision of the abutment 15 requires a separate machining process, i.e. topping the teeth of the first gear; such separate machining processes are always desirably avoided, if possible.

Figure 2:
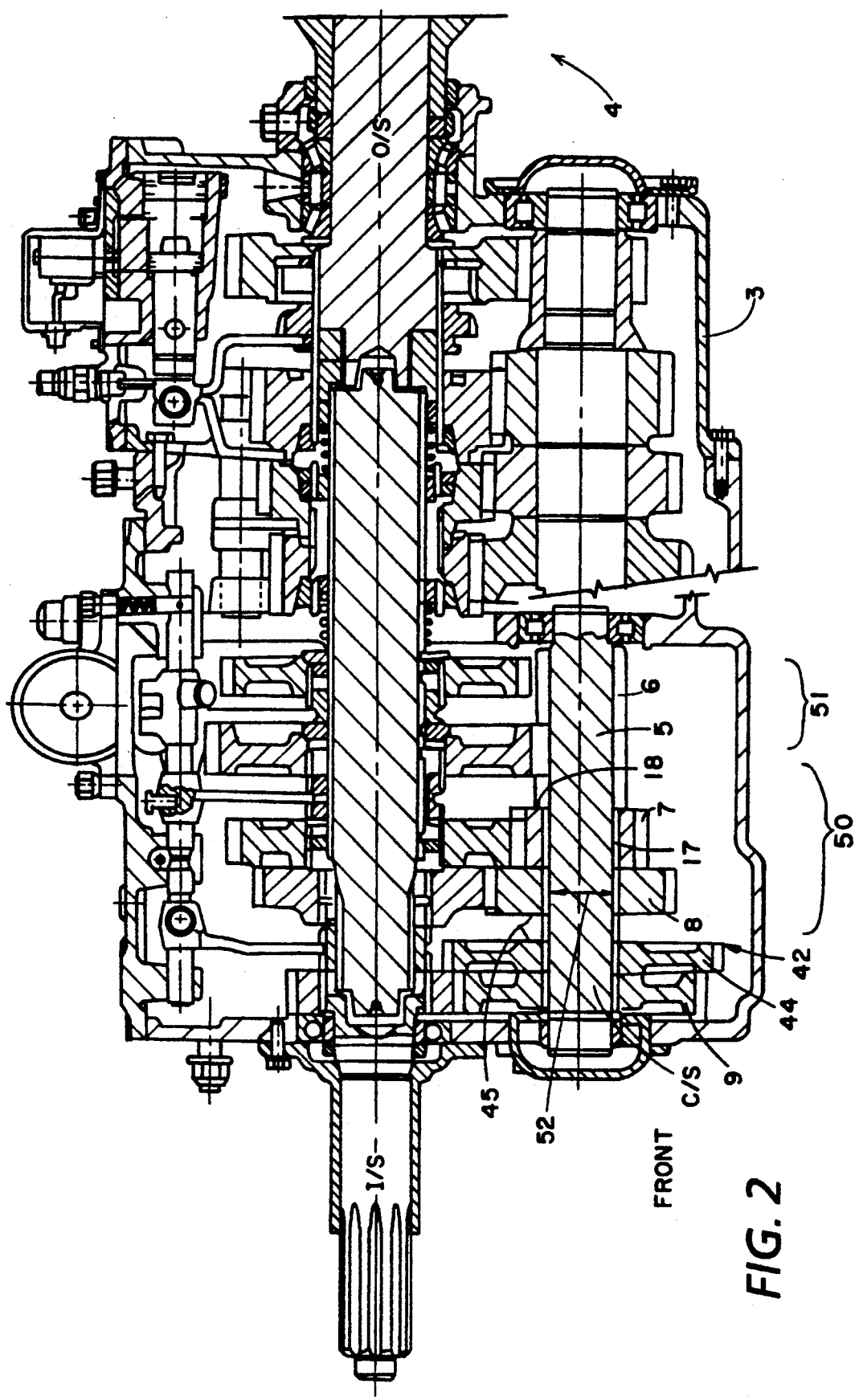
FIG. 2 shows a sectional view similar to FIG. 1, except that splines for the "second" and further subsequent gears have been formed from the teeth of the "first" gear following the inventive teachings.

The gear shaft assembly, countershaft assembly 42, of the present invention is illustrated in FIG. 2. Splines 17 for second gear 7 are provided not by machining them separately directly from the shaft 5 as was considered at first, but by producing them from extensions of the teeth of "first" gear 6, by topping the teeth, removing most or all of their addenda and possibly portions of their dedenda also (depending on the design and strength of the splines required). Preferably extensions of all the set of teeth are used, not only to give more strength and distribution of forces to the spline set, but also to avoid the time and expense of machining away whole teeth.

Alternatively, the splines may be formed as extensions of gear teeth 6 in a reduced diameter portion of the shaft.

Assembly 42 has no wasted axial run out length in shaft 5, and a proper transverse abutment shoulder 18 can be provided by all the teeth addenda of the first gear. No internally unsplined extension of the adjacent second gear 7 is required to make the abutment possible, therefore gear 7 can be slid rightward fully supported by splines right up to abutment with teeth addenda of first gear 6.

Circumferential misalignment of splines 17 with teeth of gear 6 is impossible, because the splines are derived from the teeth, and little or no flank or lateral treatment of either is required after production of the splines.

Axial positioning of the second gears is provided by the shoulder 18 and snap rings 45 or the like.

If instead of splines 17, keyways (e.g. milled Woodruff key seats) are to be used, these are machined from the tooth intervals or valleys, and all the spline teeth themselves must be entirely removed by machining. However, such an amount of machining will usually make the idea of machining keyway slots from the first gear a less attractive proposition than partially machining a set of teeth into respective involute or other splines. Even the provision of a keyway can be avoided, by producing an integral key direct from one tooth (removing the others).

It will be appreciated that the adjacent second (7) and other second (8, 9, 44) countershaft gears must be so sized relative to the first gear, as to allow the use of external splines produced on the shaft and internal splines on the second gears, to result in practical dimensions of the splines and the gears. The invention is not restricted to gears produced and splined to a countershaft, such is just an advantageous application of the invention. Gear 44 is a countershaft gear used to drive a PTO device or the like.

To allow the second gears to be received on spline teeth 17, and to define shoulder 18, it is important that the splined teeth are in and extend the entire axial length of a second shaft portion 50, adjacent the first shaft portion 51 on which the first gear teeth 6 are formed, and that the second shaft portion, in its finished configuration, have an outer diameter 52 greater than the minor diameter and no larger than, preferably smaller than, the major diameter of the first gear 6 gear teeth.

Figure 3B:
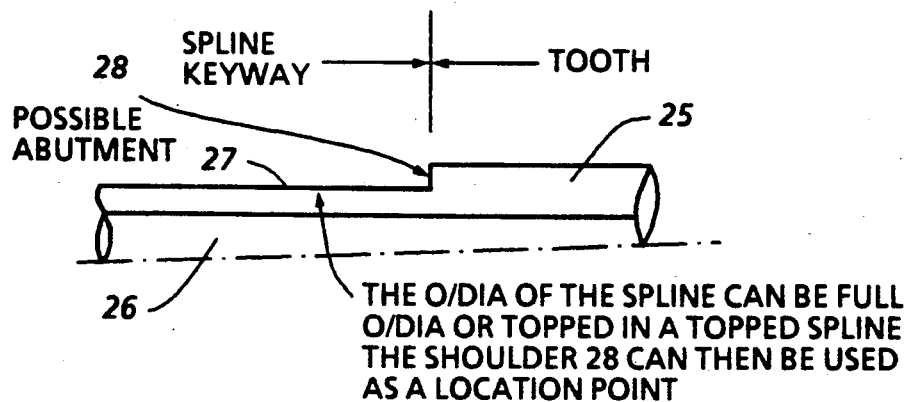
FIGS. 3A and 3B show diagramatically a tooth and a spline from separately cut first gear teeth, and spline sets, respectively, of the prior art and the invention.
Figure 3A:
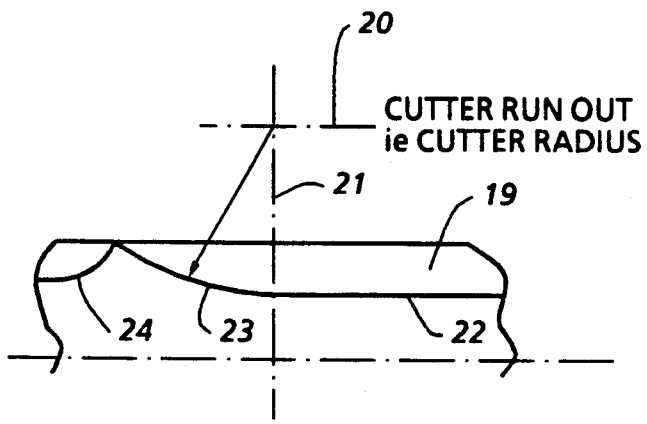

Referring now to FIG. 3A, a prior art gear tooth 19 has a machine cutter axis 20, an axial end edge 21, a root 22 and a run-out 23. A spline, not shown except for a run-out length at its root 24 is in effect spaced a long way from the gear tooth 19 by the two axial lengths 23, 24 of run-out. Even if another gear is internally splined and has a non-splined overhang as did second gear 7 of FIG. 1 at the left hand end face 15 of gear 7 as viewed, this axial length is wasted as far as giving driving strength to the spline-mounted second gear. In contrast FIG. 3B shows a gear shaft according to the present invention including a tooth 25 which originally extended over a length 26 extended for a spline 27 (or a key 27), and has been topped over length 27 to form the spline or integral key. The tooth need not be topped, but topping has the advantage of providing an abutment 28 to be used for locating a "second" gear to be slid over the splines or key 27. The second gear (not shown) does not have to be welded on, and separate splines do not have to be made. Therefore, there is no wasted run-out 23 which FIG. 1 or FIG. 3A illustrate.

Only one integral tooth-and-spline 25/27 is shown, but normally the entire set of teeth will be topped or converted into splines. Or any number down to one teeth or tooth can be machined to form key(s), the remainder of the teeth over the length 26 being removed entirely.

Figure 4:
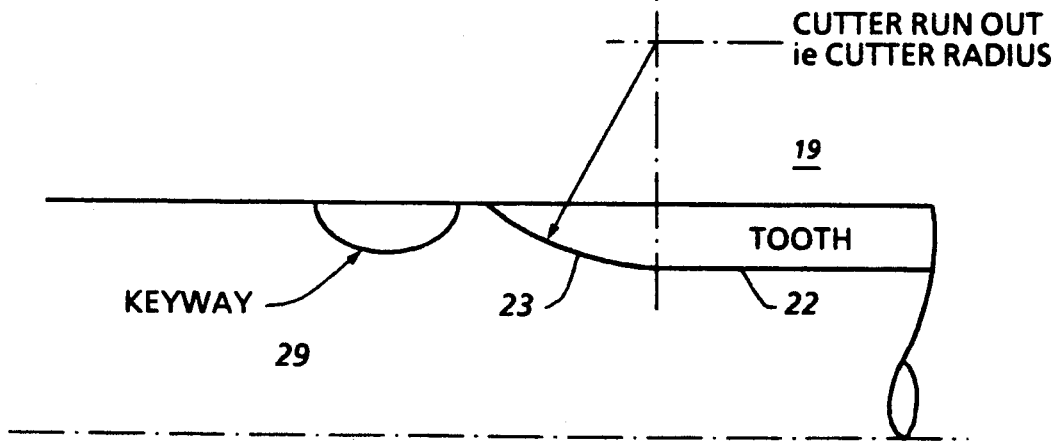
FIG. 4 shows diagramatically a separately cut tooth and woodruff keyway without the insert, also showing schematically the effects of run-out.
Figure 5:
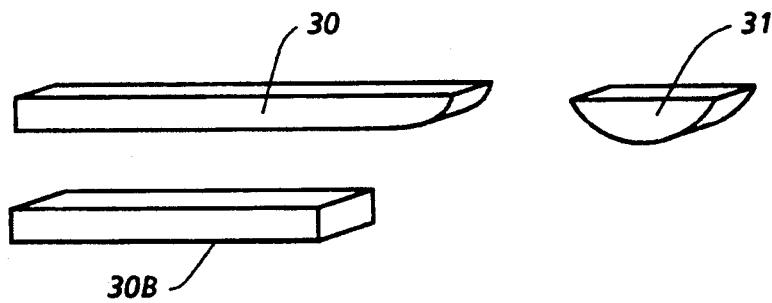
FIG. 5 shows the inserts for the FIG. 4 keyway and other inserts.

FIG. 4 shows run-out 23 of tooth 19 if a keyway 29 is to be provided—again demonstrating wasted axial length. FIG. 5 shows three typical alternative keys 30A or 30B or 31 to be inserted in keyway slot 29, as it is well-known. The inventive key 27 is integral, and so improves safety and economy in that it does not need to be installed separately.

Figure 6B:
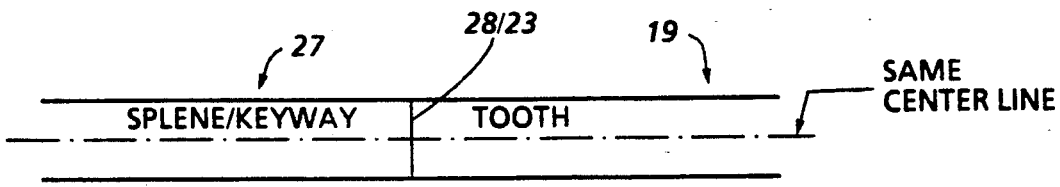
FIG. 6B shows schematically an improvement in circumferential alignment.
Figure 6A:
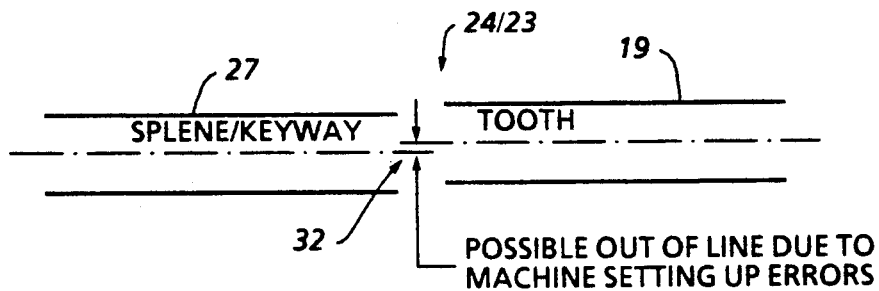
FIG. 6A shows schematically the prior art.

FIG. 6A shows another disadvantage of the prior art structure illustrated in FIG. 3A, namely that separate machining of the spline 27 and the tooth 19 leads not only to run-out and unused axial length, but also to an axial non-alignment of circumferential features—due to the two machining processes having to be set up separate. The misalignment is illustrated at 32 and is inherent in having had to set up and load a machine, machine the gear teeth 19, unload, transfer to another machine (or possibly reprogram a common machine), load for machining splines 27, and unload. Not only are there many steps, but the aforesaid run-out and misalignment problems arise. It should be noted that the orientation of one gear relative to the others, i.e. "timing", is a major consideration in a constant mesh multiple countershaft transmission.

On the other hand, provision of gear teeth and then machining splines as axial extensions of the gear teeth requires only one loading and setting up action, eliminates linear run-out and misalignment, except insofar as the flanks or corners of the teeth or splines (usually standard involute) may be machined for some reason. The splines would in general be topped as aforesaid, and abutment shoulders 28 be therefore provided at the teeth for the second gear (see FIGS. 3B, 6B); but topping is not essential because the relative diameters of the first and second gears may be such that splines 27 and teeth 19 can be of equal full height.

Alternatively, the diameter of that portion of the shaft destined for the set of splines can be reduced by machining to the selected outside diameter of the spline set, and then the teeth and their extensions can be produced. The splines are then partly or completely produced at the same time and in the same step, as the tooth extensions.

Accordingly, improved transmission gear shaft carrying at least one first gear (6) formed integrally therewith and one second gear (7) removably mounted thereto for rotation therewith is provided.

The description of the preferred embodiments of the present invention is by way of example only and various modifications and/or rearrangement of the parts are contemplated without department from the spirit and the scope of the invention as hereinafter claimed.

We claim:

1. A gear shaft assembly (42) comprising a shaft (5) having at least a first gear (6) and a second gear (7) fixed for rotation therewith, said assembly comprising:

a gear shaft (5) having a first portion (51) with a set of axially extending first gear teeth (6) defining a major diameter and a minor diameter formed integrally therein and a second portion (50) adjacent said first portion and having an outer diameter (52) no greater than the major diameter of said gear teeth and larger than the minor diameter of said gear teeth, at least one spline tooth (17) extending the entire axial length of said second portion and comprising an axial extension of one of said gear teeth, and said second gear having internal splines drivingly engaged with said spline tooth carried by said second portion of said shaft.

2. The gear shaft of claim 1 wherein each of said first gear teeth define axial extensions thereof extending the entire axial length of said second portion to define a set of spline teeth therein.

3. The gear shaft assembly of claims 1 or 2 wherein said second portion is of an outer diameter less than the major diameter of said gear teeth to define a radially extending shoulder (18) at the intersection of said first and second portions.

4. The gear shaft assembly of claims 1 or 2 wherein said first gear teeth are of an involute profile and said spline teeth are of a corresponding profile.

5. The gear shaft assembly of claim 3 wherein said gear teeth are of an involute profile and said spline teeth are of a corresponding profile.

6. A method for making a gear shaft (5) having a first portion (51) with a set of axially extending gear teeth (6) defining a major diameter and a minor diameter formed integrally therein and a second portion (50) adjacent said first portion and having an outer diameter (52) no less than the major diameter of said gear teeth and larger than the minor diameter of said gear teeth, spline teeth (17) extending the entire axial length of said second portion and comprising axial extensions of said gear teeth, said method comprising:

providing a shaft wherein said first and second portions are of the same diameter, then reducing the outer diameter of said second portion, and then forming said gear teeth and said spline teeth in a single continuous operation.

7. The method of claim 6 wherein said gear teeth are of an involute profile and said spline teeth are of a corresponding profile.

* * * * *